United States Patent [19]

Wiesboeck

[11] 3,907,977

[45] Sept. 23, 1975

[54] METHOD FOR THE PREPARATION OF HIGH PURITY, HIGHLY SURFACE ACTIVE LIASF$_6$

[75] Inventor: Robert A. Wiesboeck, Stone Mountain, Ga.

[73] Assignee: United States Steel Corporation, Pittsburgh, Pa.

[22] Filed: Apr. 25, 1974

[21] Appl. No.: 464,272

Related U.S. Application Data

[60] Continuation-in-part of Ser. No. 327,357, Jan. 29, 1973, abandoned, which is a continuation-in-part of Ser. No. 194,563, Nov. 1, 1971, abandoned, which is a division of Ser. No. 33,883, May 1, 1970, Pat. No. 3,654,330, which is a continuation-in-part of Ser. No. 829,111, May 29, 1969, Pat. No. 3,594,402.

[52] U.S. Cl. .............. 423/464; 423/87; 260/465.1
[51] Int. Cl.$^2$ ...................... C01B 9/08; C01D 15/04; C01B 27/00

[58] Field of Search ............... 423/464, 179, 87, 88; 260/465.1

[56] References Cited

UNITED STATES PATENTS

| | | | |
|---|---|---|---|
| 3,655,332 | 4/1972 | Smith, Jr. | 423/464 |
| 3,848,063 | 11/1974 | Cannon et al. | 423/464 |

*Primary Examiner*—Edward Stern
*Attorney, Agent, or Firm*—William L. Krayer

[57] ABSTRACT

High purity, highly surface active LiAsF$_6$ is prepared by warming a pure tetraacetonitrilolithium hexafluoroarsenate complex under temperature and pressure conditions sufficient to dissociate the complex and evolve all the CH$_3$CN, said conditions being below that at which the LiAsF$_6$ will dissociate.

2 Claims, No Drawings

METHOD FOR THE PREPARATION OF HIGH PURITY, HIGHLY SURFACE ACTIVE LIASF$_6$

This application is a continuation-in-part of Ser. No. 327,357, filed Jan. 29, 1973, now abandoned, which is a continuation-in-part of Ser. No. 194,563 filed Nov. 1, 1971, now abandoned, which is a division of Ser. No. 33,883 filed May 1, 1970 and issued as U.S. Pat. No. 3,654,330 on Apr. 4, 1972, which, in turn, is a continuation-in-part of Ser. No. 829,111, filed May 29, 1969 and issued as U.S. Pat. No. 3,594,402 on July 20, 1971.

BACKGROUND OF THE INVENTION

This invention relates to lithium compounds and more particularly to improved lithium hexafluorophosphate and lithium hexafluoroarsenate.

The preparation of LiPF$_6$ is well known. It can be prepared by the action of bromine trifluoride on LiF and an excess of P$_2$O$_5$, but the product always contains LiF. When prepared by the action of PF$_5$ on LiF in anhydrous HF typical purities are 90–95 percent LiPF$_6$. Thus, conventional methods produce only impure LiPF$_6$. Further, the latter method requires the use of hazardous HF as a solvent and thus is not easily adaptable to commercial use. Further, the product may contain LiHF$_2$ as an impurity. This contains protons which are very detrimental for some uses such as for anhydrous batteries and the like. The purification is complicated due to the hygroscopicity and limited thermal stability of LiPF$_6$. Dissociation to PF$_5$ and LiF begins to take place at about 20°C, making purification and even removal of solvents difficult. Certain industrial applications such as in the electric current producing cell of U.S. Pat. No. 3,415,687, require LiPF$_6$ of highest purity, above about 99 percent, for best performance. However, conventional methods, as pointed out above, product at best material of up to 95 percent LiPF$_6$. This material is not entirely suitable because the impurities can interfere with storage stability and solubility of the material. High purity LiAsF$_6$ is also useful as cell electrolyte as demonstrated in U.S. Pat. No. 3,415,687.

SUMMARY OF THE INVENTION

The invention provides tetraacetonitrilolithium hexafluorophosphate, Li(CH$_3$CN)$_4$PF$_6$, and improved lithium hexafluorophosphate, LiPF$_6$, derived therefrom as well as methods for the preparation of these new compositions. Li(CH$_3$CN)$_4$PF$_6$ may be prepared in accordance with the invention by the action of excess CH$_3$CN on LiF and PF$_5$ or by the action of excess CH$_3$CN on even impure LiPF$_6$ at a temperature of about −40° to about 80°C, preferably 0°–80°C for LiPF$_6$ starting material and −10° to 20°C for LiF and PF$_5$ starting material. The tetraacetonitrilolithium hexafluorophosphate can be prepared by several alternate routes beginning with the basic raw materials acetonitrile, phosphorus pentafluoride and lithium fluoride. The order of addition of these basic components is not critical to the success of the overall process, but it is strongly preferred to follow a certain order of addition for most economic and satisfactory operation of the process. Thus it is possible to combine the phosphorus pentafluoride with an excess of acetonitrile in the absence of any lithium fluoride. This, however, will cause the formation of a precipitate which is probably an adduct between phosphorus pentafluoride and acetonitrile which must then in turn be reacted in slurry form with lithium fluoride in order to cleave the adduct and form the desired compound. A better procedure is to first combine the lithium fluoride with an excess of acetonitrile since the lithium fluoride is more reactive than the acetonitrile toward the PF$_5$. Combination of lithium fluoride with excess acetonitrile, with subsequent addition of phosphorus pentafluoride, therefore, leads to a smooth and economical process. It is important, but not crucial, to the preferred process, therefore, that the reaction system always contain not more than a stoichiometric amount of the phosphorus pentafluoride. The Li(CH$_3$CN)$_4$PF$_6$ can be isolated from the excess CH$_3$CN by removal of the latter under vacuum. It can be isolated in very pure form of 99 percent or better by separating the solution thereof from any impurities and cooling the filtrate below about 0° under partial vacuum with withdrawal of CH$_3$CN which is not chemically bound into the new compound.

Only acetonitrile acts on LiF and PF$_5$ or LiPF$_6$ to form the new compound, Li(CH$_3$CN)$_4$PF$_6$. The nearest homologue, propionitrile, as is illustrated by an example given below does not form a compound. Further, the CH$_3$CN does not react with or dissolve LiF or other common impurities in conventionally prepared LiPF$_6$ so that the Li(CH$_3$CN)$_4$PF$_6$ can be easily separated from the impurities and used to produce pure LiPF$_6$. Therefore, the action of excess acetonitrile on LiF and PF$_5$ is unique and provides a useful new compound.

One use for Li(CH$_3$CN)$_4$PF$_6$ is the production of improved, high purity LiPF$_6$. When Li(CH$_3$CN)$_4$PF$_6$ is warmed above about 20°C under a partial vacuum it dissociates into LiPF$_6$ and CH$_3$CN. If the warming and partial vacuum are continued until substantially all CH$_3$CN has been evolved and separated, a LiPF$_6$ of exceptionally high purity and high surface area is obtained. LiPF$_6$ prepared by this process can be used where the highest purity LiPF$_6$ heretofore obtainable has not been entirely satisfactory, e.g. for the preparation of the electrolyte solution in organic solvents for use in anhydrous electric cells such as in U.S. Pat. No. 3,415,687.

Removal of the CH$_3$CN in the solid state produces a highly surface active LiPF$_6$. The purity of the resulting LiPF$_6$ is about 99 percent, provided that the starting Li(CH$_3$CN)$_4$PF$_6$ is at least 99 percent pure and the CH$_3$CN is completely removed.

The compound Li(CH$_3$CN)$_4$PF$_6$ is unique in that acetonitrile solutions of the compound can be heated at 80°C for 3 hours without excessive decomposition whereas LiPF$_6$ decomposes at much lower temperatures of e.g. 30° to 40°C to LiF and PF$_5$. It is pointed out, however, that the solubility of Li(CH$_3$CN)$_4$PF$_6$ in acetonitrile is strongly temperature dependent. A saturated solution contains 82 g/100 ml at 60°C and 11 g/100 ml at 0°C. Excess CH$_3$CN may be removed in any suitable manner but vacuum evaporation at −10° to 0°C is preferred.

The pure crystals of Li(CH$_3$CN)$_4$PF$_6$ melt at 65° to 66°C without decomposition. By contrast LiPF$_6$ exhibits a PF$_5$ equilibrium pressure of 60 mm Hg at 65°C. There is no dissociation of Li(CH$_3$CN)$_4$PF$_6$ to LiF and PF$_5$ until all of the CH$_3$CN has been removed. In other words, when Li(CH$_3$CN)$_4$PF$_6$ is heated under partial vacuum all of the CH$_3$CN is evolved before there is any decomposition of the LiPF$_6$.

Another use for $Li(CH_3CN)_4PF_6$ is as a polymerization catalyst for cyclic ethers or unsaturated hydrocarbons.

Tetraacetonitrilolithium hexafluoroarsenate may be prepared in accordance with the invention by the action of excess $CH_3CN$ on $LiAsF_6$ at a temperature of about $-40°$ to $80°C$, preferably $0°-80°C$. The formed $Li(CH_3CN)_4AsF_6$ can be isolated by removal of the excess $CH_3CN$ under vacuum or better by separating any undissolved impurities by filtration and cooling of the filtrate to about $0°C$. The solubility of $Li(CH_3CN)_4AsF_6$ in acetonitrile is strongly temperature dependent. A saturated solution contains $155.5$ g/100 ml at $40°C$ and $26.8$ g/100 ml at $2°C$. The precipitated $Li(CH_3CN)_4AsF_6$ is freed from adhering, not chemically bound $CH_3CN$ under partial vacuum.

The so-purified $Li(CH_3CN)_4AsF_6$ complex is especially useful for the production of high purity, highly surface active $LiAsF_6$. As stated hereinabove, $LiAsF_6$ is employed as an electrolyte for battery systems. In this application, the purity of the $LiAsF_6$ is of critical importance. Thus, both the performance and stability of the battery are significantly affected by the presence of (a) acidic impurities, and (b) even rather minute amounts of moisture.

Conventional methods for preparing anhydrous $LiAsF_6$ involve heating of the partially dried material in vacuo (e.g., < 1 mm Hg.). However, in order to reduce the moisture level to less than about 300 ppm, the temperature has to be raised to above $65°C$, thereby resulting in the formation of acidic decomposition products, as evidenced by the acid pH of an aqueous solution of the so-dried product. Thus, a 1 molar aqueous solution of commercial anhydrous $LiAsF_6$ will exhibit a pH of between 3 and 4.

In contrast, it is a particular feature of the $LiAsF_6$ prepared by the instant process, that a moisture level of less than 50 ppm $H_2O$ is achievable, without the concommitant production of acidic decomposition products. Thus, the dehydrated $LiAsF_6$ of this invention will exhibit a substantially neutral pH (i.e. between 6 and 7) when dissolved to a 1 molar concentration in pure water.

The higher purity $LiAsF_6$ of this invention is produced by warming the pure $Li(CH_3CN)_4AsF_6$ complex under temperature and pressure conditions which are sufficient to dissociate the complex and liberate substantially all the $CH_3CN$; while not being so severe as to dissociate the $LiAsF_6$ as well (the latter dissociation resulting in the aforementioned acidic decomposition products). Thus, for practical considerations, the $CH_3CN$ may be evolved at temperatures of from $0°$ to $80°C$ (preferably $20°-30°C$), at pressures below about 20 mm Hg, without effecting the dissociation of $LiAsF_6$. It should be noted that the evolution of the $CH_3CN$ produces a rather significant cooling effect and it is therefore necessary that heat be supplied to the system, even to maintain a temperature of about $0°C$.

The invention is further illustrated by the following examples.

EXAMPLE I

The Preparation of $Li(CH_3CN)_4PF_6$

Phosphorus pentafluoride was introduced into a slurry of 23 g of LiF in 1 liter of anhydrous, freshly distilled acetonitrile while cooling to $0°C$ and stirring vigorously.

After approximately 125 g of $PF_5$ had been absorbed the gas introduction was terminated and the slurry was warmed to $60°$ to $70°C$, filtered and cooled to $0°C$. The precipitate was collected by filtration and dried in vacuum at $0°$ to $5°C$. A total of 82 g of $Li(CH_3CN)_4PF_6$, melting at $65°$ to $75°C$, was obtained.

X-Ray diffraction pattern was as follows:

| A | Intensity, % | A | Intensity, % |
|---|---|---|---|
| 8.7 | 25 | 3.56 | 75 |
| 6.3 | 100 | 3.02 | 10 |
| 5.1 | 90 | 2.98 | 12 |
| 4.65 | 15 | 2.96 | 11 |
| 4.33 | 30 | 2.86 | 11 |
| 4.12 | 35 | 2.78 | 10 |
| 4.02 | 20 | 2.62 | 5 |
| 3.72 | 70 | 2.54 | 5 |
| 3.63 | 100 | 2.48 | 5 |

EXAMPLE II

Stability Test of $Li(CH_3CN)_4PF_6$ in Acetonitrile

A solution of 80.0 g of $Li(CH_3CN)_4PF_6$ in 100 ml anhydrous acetonitrile (freshly distilled from calcium hydride) was heated to $80°C$ for 3 hours while excluding moisture by a stream of dry nitrogen. After cooling to ambient temperature and storage overnight, the precipitated crystals were removed by filtration. Concentration of the filtrate to 30 ml and cooling to $0°$ produced a second crop of crystals. The combined precipitates were dried in vacuum at $0°$ yielding 73.5 g of $Li(CH_3CN)_4PF_6$ (92 percent recovery).

EXAMPLE III

Propionitrile as Solvent for $LiPF_6$

Lithium hexafluorophosphate (20.0 g), prepared from lithium fluoride and phosphorus pentafluoride, was dissolved in 100 ml dry propionitrile at $55°C$. The solution was stored at ambient temperature for several days and was then slowly concentrated in partial vacuum. No precipitate formed. An oil separated on cooling to $0°C$ which resisted all attempts to induce crystallization by customary methods.

EXAMPLE IV

$Li(CH_3CN)_4PF_6$ as Polymerization Catalyst

An anhydrous solution of 50.0 g of trioxane (freshly distilled) in 50.0 g of acetonitrile was warmed to $70°C$ while excluding moisture by a stream of dry nitrogen. To the stirred solution was added 0.5 g of $Li(CH_3CN)_4PF_6$ dissolved in 5 ml anhydrous acetonitrile. The polymerization of trioxane began within minutes as indicated by precipitation of insoluble material. After 3 hours the mixture was cooled to room temperature, filtered and the insoluble portion was washed several times with acetone and then with water. Drying in vacuum at $50°C$ yielded 30.5 g polyoxymethylene polymer (61 percent).

EXAMPLE V

The Preparation of Lithium Hexafluorophosphate

A 2-liter stirred autoclave was charged with 82.0 g lithium fluoride, evacuated and cooled to $-78°C$. One liter of anhydrous hydrogen fluoride was condensed into the reactor and the mixture was warmed to $25°C$ while stirring. After 1 hour the autoclave was pressurized with phosphorus pentafluoride until a constant pressure of 50 psi was reached. Excess phosphorus pentafluoride and the solvent was removed the following day by condensation into an evacuated cylinder cooled with liquid nitrogen. The autoclave contained 383 g of crude lithium hexafluorophosphate (92.1 percent $LiPF_6$).

Another possibility is to react LiF with $PF_5$ in the absence of HF, but the reaction takes longer and the product is even more impure. It can, however, be reacted with $CH_3CN$ to prepare the $Li(CH_3CN)_4PF_6$.

Crude lithium hexafluorophosphate (620 g) prepared as above was added to 1 liter of anhydrous acetonitrile while stirring. The temperature of the slurry rose to 55°C, and was further increased to 70°C by external heating. Insoluble material was removed by filtration. The brown solution was decolorized by activated carbon. On cooling to room temperature, large colorless needles precipitated and were collected. A second crop was obtained by cooling the filtrate to −10°C.

Drying of the combined precipitates in vacuum at 0° to 5°C produced 1130 g of $Li(CH_3CN)_4PF_6$. The compound melted at 65° to 75°C. Complete removal of the acetonitrile was achieved by warming to 30°C in an evacuated system with an attached cold trap maintained at −78°C. Yield: 551 g of 99.7 percent $LiPF_6$.

EXAMPLE VI

The Preparation of $LiAsF_6$

Aqueous 65 percent hexafluoroarsenic acid (160 ml) was added to a saturated solution of lithium hydroxide (500 ml) while stirring rapidly. The resulting slurry was filtered hot and the filtrate evaporated to dryness under partial vacuum. The remaining crude $LiAsF_6$ (150 g) was used for the preparation of $Li(CH_3CN)_4AsF_6$ as outlined below.

EXAMPLE VII

The Preparation of $Li(CH_3CN)_4AsF_6$

Crude $LiAsF_6$ (150.0 g) was added to anhydrous acetonitrile (400 ml) while stirring. The exothermic interaction increased the temperature to 50°C. The solution was then filtered hot and the product precipitated by cooling. Filtration and drying under partial vacuum produced crystalline $Li(CH_3CN)_4AsF_6$ (240.5 g). The compound exhibited the following x-ray diffraction pattern.

| A | Intensity, % | A | Intensity, % |
|---|---|---|---|
| 8.70 | 40 | 3.35 | 18 |
| 6.30 | 65 | 3.15 | 6 |
| 5.68 | 2 | 3.00 | 5 |
| 5.12 | 100 | 2.96 | 2 |
| 4.63 | 3 | 2.86 | 2 |
| 4.38 | 14 | 2.80 | 3 |
| 4.13 | 5 | 2.56 | 6 |
| 4.06 | 6 | 2.14 | 3 |
| 3.72 | 11 | 2.09 | 7 |
| 3.64 | 38 | 1.873 | 3 |
| 3.59 | 80 | 1.845 | 3 |

EXAMPLE VIII

Preparation of $LiAsF_6$ from $Li(CH_3CN)_4AsF_6$

All manipulations were carried out in a dry environment, excluding moisture by an atmosphere of dry nitrogen to prevent contamination of the hydroscopic product.

Tetraacetonitrilolithium hexafluoroarsenate, $Li(CH_3CN)_4AsF_6$, (993 g), was placed in a 3-liter flask and evacuated to 0.1 mm Hg. The charge was heated by infrared radiation to 50°C. as indicated by a thermometer immersed into the flask content. Volatilized acetonitrile was collected in an attached cold trap which was maintained at −78°C. by dry ice. After completion of the process, a total of 452 g acetonitrile had accumulated. The remaining lithium hexafluoroarsenate (539 g) was a free-flowing powder containing only 47 ppm water as established by the Karl Fischer method. A 1-molar aqueous solution of the product had a pH of 6.8.

It is to be understood that the foregoing working examples are given for the purpose of illustration and that any other processes, order of addition, temperature or the like set forth above may be used, provided that the teachings of this disclosure are followed.

Various modifications can be made in the process of the present invention without departing from the spirit or scope thereof for it is understood that we limit ourselves only as defined in the appended claims.

I claim:

1. A process for the preparation of high purity, highly surface active $LiAsF_6$, which comprises,
    effecting the evolution and removal of substantially all the $CH_3CN$ from a $Li(CH_3CN)_4AsF_6$ complex, said evolution being achieved at a pressure of less than about 20 mm Hg, while maintaining the temperature thereof within the range of 0° to 80°C.

2. The process of claim 1, wherein said temperature is between 20° to 30°C.

* * * * *

Disclaimer 3,907,977.—*Robert A. Wiesboeck*, Stone Mountain, Ga. METHOD FOR THE PREPARATION OF HIGH PURITY, HIGHLY SURFACE ACTIVE LIASF$_6$. Patent dated Sept. 23, 1975. Disclaimer filed Oct. 6, 1976, by the assignee, *United States Steel Corporation*.

Hereby enters this disclaimer to all claims of said patent.

[*Official Gazette December 14, 1976.*]